United States Patent [19]
D'Heygere

[11] Patent Number: 5,211,296
[45] Date of Patent: May 18, 1993

[54] DEVICE AND PROCESS FOR THE STORAGE OF PRODUCTS

[76] Inventor: Philippe N. D'Heygere, Waalvest 15, B-8930 Menen, Belgium

[21] Appl. No.: 769,315

[22] Filed: Oct. 1, 1991

[51] Int. Cl.⁵ ............................................. A47F 5/00
[52] U.S. Cl. .................................. 211/187; 211/175; 211/1.57
[58] Field of Search .............. 211/207, 175, 187, 1.51, 211/1.56, 1.57; 312/306, 310, 312

[56] References Cited

U.S. PATENT DOCUMENTS

| | | | |
|---|---|---|---|
| 4,329,928 | 5/1982 | Shaw | 211/1.57 X |
| 4,345,802 | 8/1982 | Sorensen | 312/312 X |
| 4,936,735 | 6/1990 | Ryan | 211/1.57 X |
| 5,013,983 | 5/1991 | Futch et al. | 211/1.57 X |

*Primary Examiner*—Robert W. Gibson, Jr.
*Attorney, Agent, or Firm*—Sughrue, Mion, Zinn, Macpeak & Seas

[57] ABSTRACT

A device and process for the storage of products in a frame and for the removal from the frame of products stored therein. A frame is provided with guides for guiding supports for the products over a distance in a direction perpendicular to the direction in which the guides stretch separating the guide for one support from the guide for another support. There is a working place for a support removed from the frame or to be stored in said frame. An element removes one support from the frame and brings it on the working place and stores one support in the frame. A circuit feeds power to a system for moving the element in a direction substantially perpendicular to the direction in which the guides stretch. A sensor detects a dimension of a support provided with the product to be stored and actuates a switch of the circuit so as to move the support for its storage when the dimension detected by the sensor is less than the distance between the guide on which the support has to be placed and the adjacent guide.

31 Claims, 6 Drawing Sheets

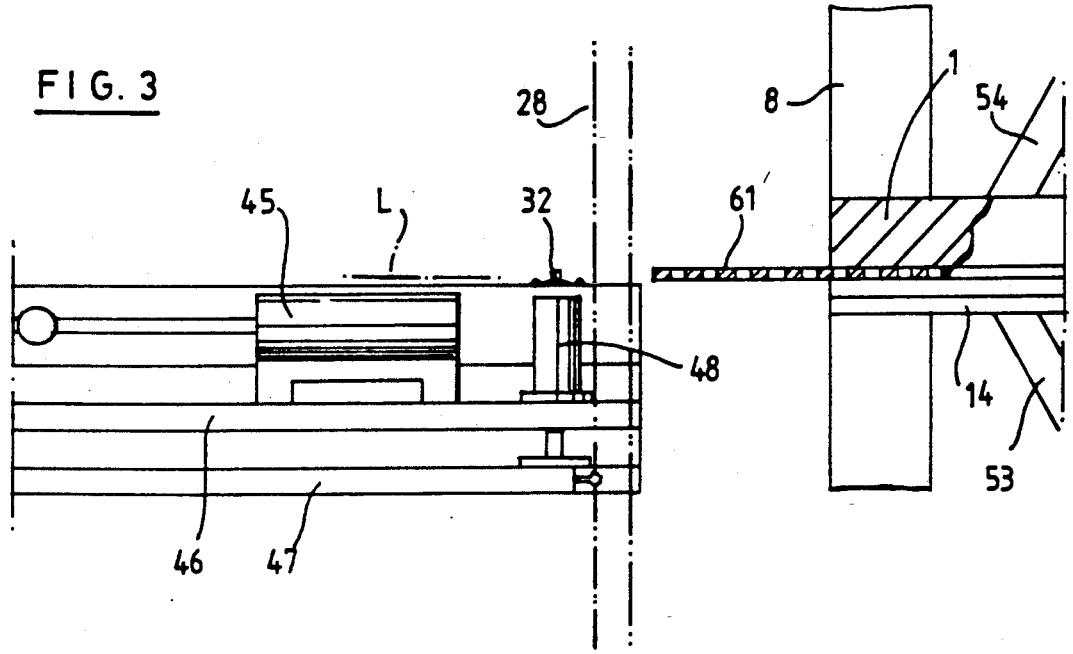
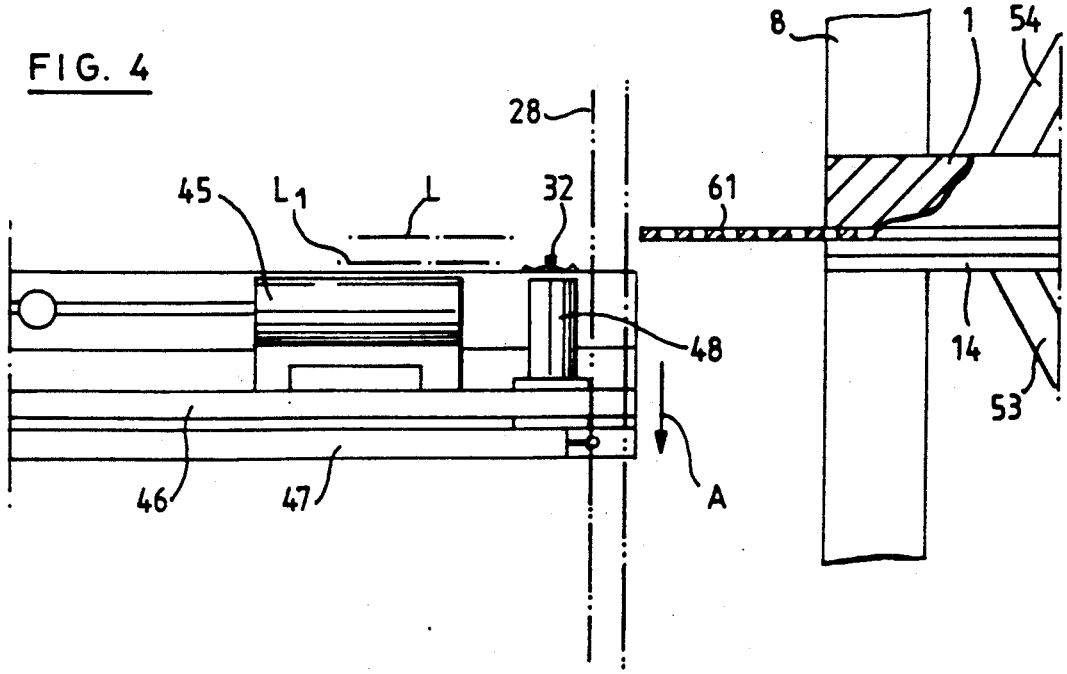

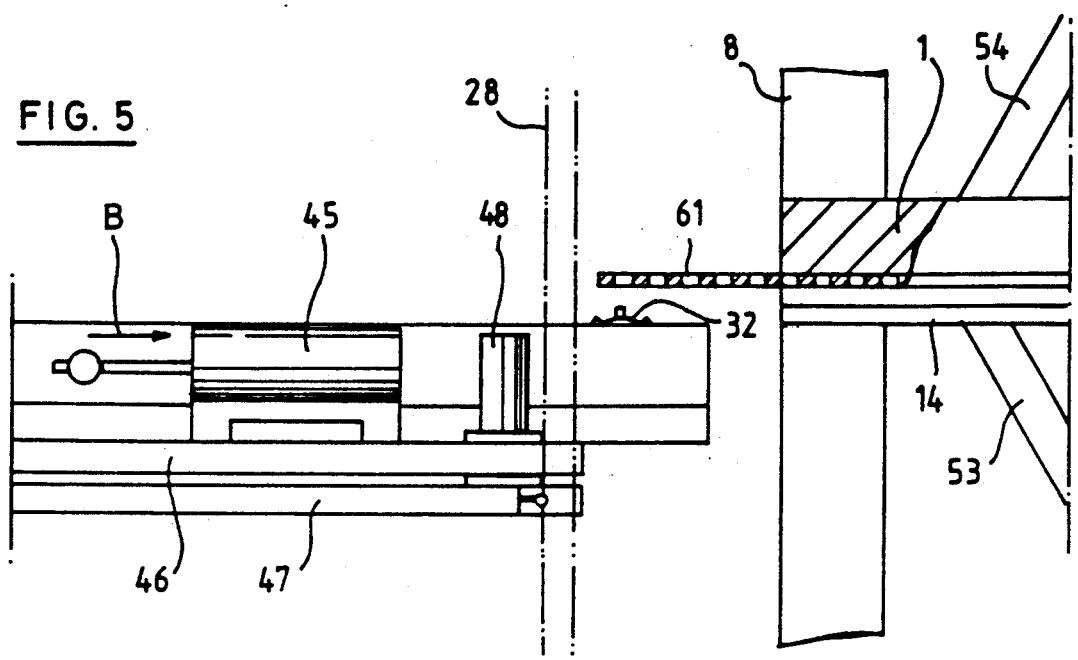
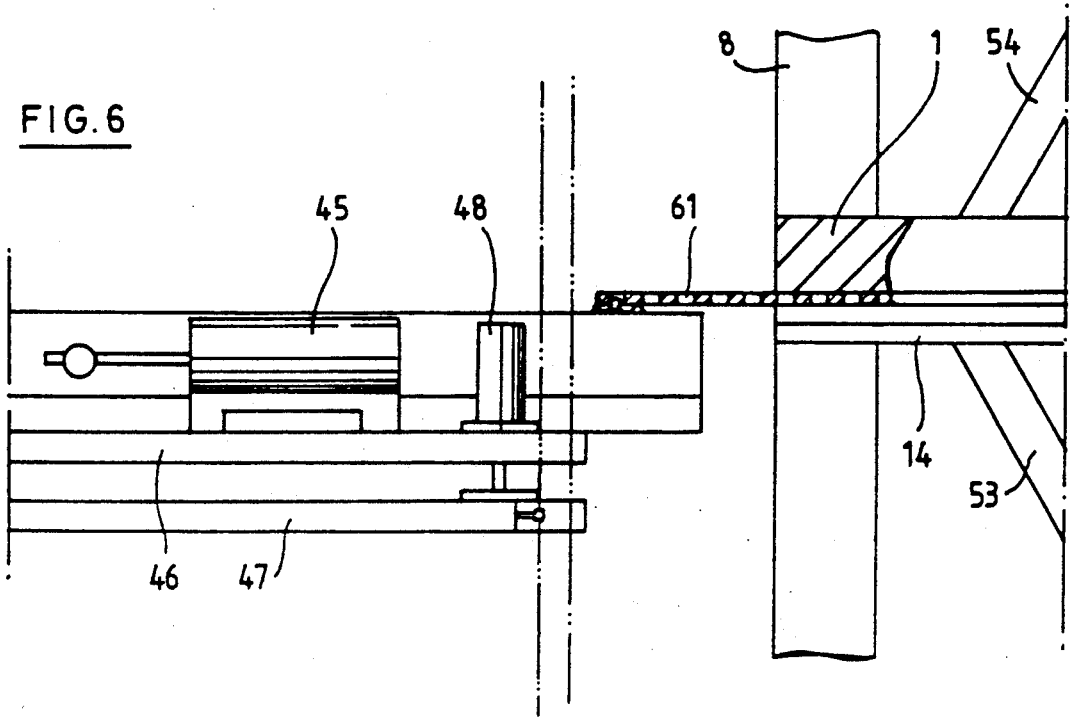

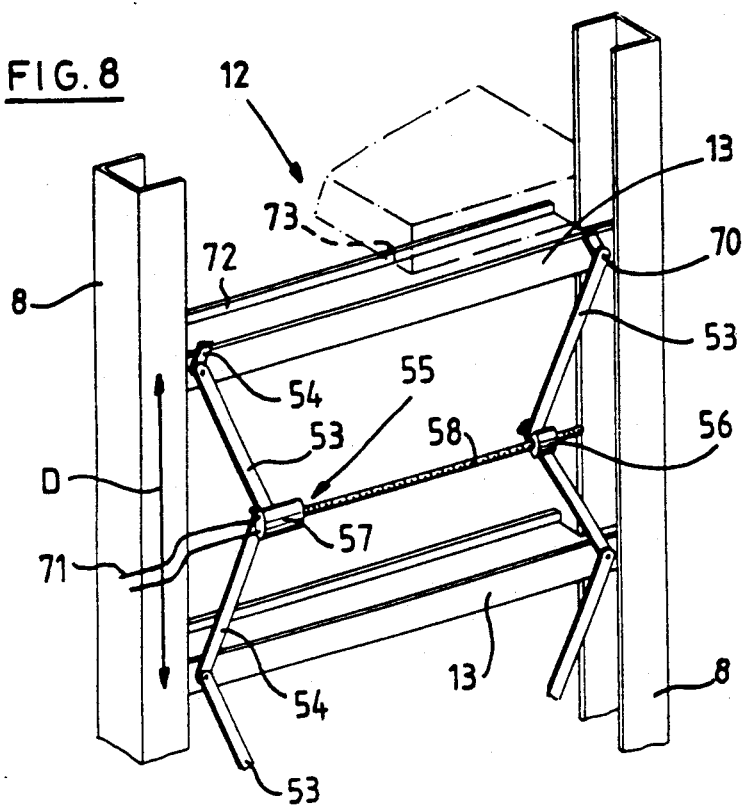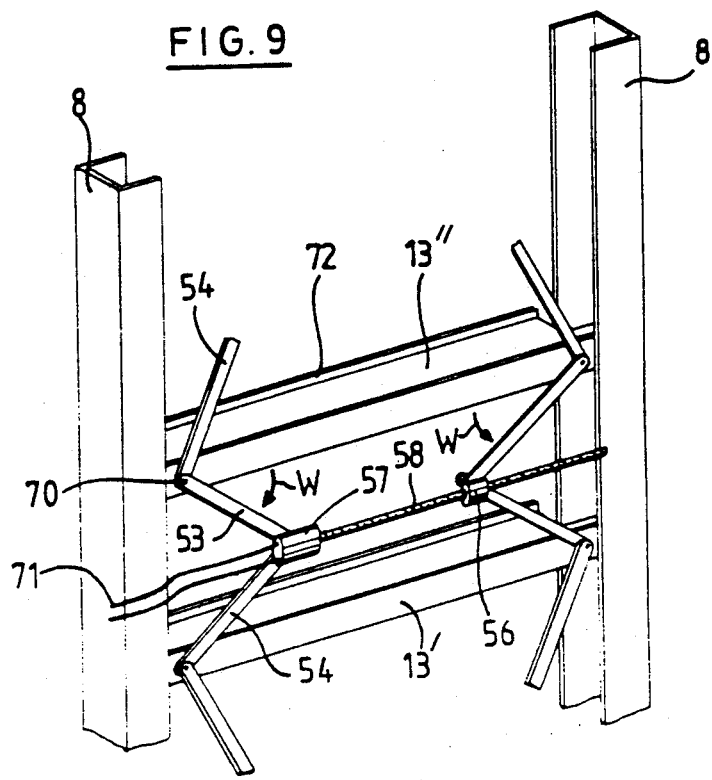

DEVICE AND PROCESS FOR THE STORAGE OF PRODUCTS

THE PRIOR ART

Products such as boxes, cans, papers, etc have up to now been stored in various manners.

For papers, or products having a low weight such as pharmaceutical vials, etc it is known to use a device comprising a plurality of plates separated from each other by a constant distance and linked by a pivot to a chain driven by a motor. The plates are also provided with an arm, the free end of which is provided with a roller guided in a rail, so as to ensure that the plates remain in a substantially horizontal plane.

For taking a product from a specific plate, all the plates have to be moved up to the moment when said specific plate is in front of a working table. This means that the power of the motor has to be over dimensioned so as to ensure the movement of the plates even if only a few adjacent plates are loaded with products.

The loss of place with such a device is important.

Due to the fact that the distance between two adjacent plates is limited, a direct accessibility, to the products placed on a plate is not possible. Therefore, boxes or containers containing the products to be stored have to be placed on the plate. For taking a product, a box has to be taken out from the plate. This means that the surface of the working table has at least to be substantially equal to the surface of a plate. The loss of place is due to the fact that the plates cannot move above or under the working table.

In such a machine the distance between two adjacent plates cannot be changed.

For products having higher weight, it is known to place them on pallets and to displace such pallets by means of a fork-lift-truck. The movement of such a truck requires much place.

In order to save some place, it is known to use a multi level frame, a constant distance separating the level from each other.

Moreover, the user of such a truck is not able to be sure that the height of the pallet which has to be placed in a frame is lower than the distance separating two adjacent levels of the frame. If this would not be the case, an accident would occur. In order to prevent such accidents, the distance between the levels will be higher than required i.e. there will be a big loss of space.

The present invention has for aim to obviate said drawbacks, i.e. to provide a device for the storage of products in which the loss of space is minimized.

BRIEF DESCRIPTION OF THE INVENTION

The present invention relates to a device for the storage of products in a frame and for the removal from the frame of products stored therein.

The device according to the invention is a device in which a minimum space is lost and in which the required power of the motor has not to be overdimensioned.

The device according to the invention comprises:
(a) a frame provided with means for guiding supports for said products, a distance in a direction perpendicular to the direction in which the guiding means stretch separating the guiding means for one support from the guiding means for another support;
(b) a working place for a support removed from the frame or to be stored in said frame;
(c) an element for removing one support from said frame and bringing it on the working place and for storing one support in said frame;
(d) a circuit for feeding power to a system for moving the element in a direction substantially perpendicular to the direction in which the guiding means stretch, and
(e) a sensor for detecting a dimension of the support provided with the product to be stored, said sensor actuating a switch of said circuit so as to move a support to be stored when the dimension detected by the sensor is lower to the distance between the guiding means on which the support has to be placed and the adjacent guiding means.

According to an embodiment of a device according to the invention, the frame consists of a first part for the storage of supports and of a second part for allowing movement of the element. The first part comprises:
(a) at least two pairs of uprights,
(b) traverse beams placed between the uprights and
(c) pairs of rails as guiding means for the supports, a first rail of a pair stretching between two uprights while the other rail of said pair stretches between two other uprights in a direction which is substantially parallel to the direction in which the first rail stretches.

The second part comprises vertical and traverse beams, two vertical beams being advantageously two uprights of the first part. According to a particularity of said embodiment, the rails of a pair stretch in a substantially horizontal plane.

According to a particularity of the device according to the invention and especially of the embodiment thereof, the element comprises:
(a) means for gripping a support from the frame;
(b) means for transferring a support from the element to the frame;
(c) means for gripping a support from the working place, and
(d) means for transferring a support from the element to the working place.

Advantageously, the means for gripping and transferring a support comprises at least one gear wheel driven by a motor, the teeth of said gear wheel being intended to work with a rack fixed on the support.

For example, the means for gripping and transferring a support comprises at least one gear wheel driven by a motor, the teeth of said gear wheel being intended to work with a rack fixed on the support, the power of the motor being fed by a circuit comprising a switch actuated by a sensor, said sensor when detecting the end of a gripping operation actuating the switch so that the motor no more drives the gear wheel.

According to another particularity of the device according to the invention and especially of the embodiment thereof, the element comprises a sensor actuating a switch mounted in the circuit for feeding power to the system for moving the element, so as to move said element up to a predetermined place.

For example the sensor opens the circuit so that power is no more fed to the system when the sensor detects a predetermined guiding means for one support. Preferably, for the removal of a support from the frame, the sensor opens the circuit when it detects the presence of a predetermined support, while for storing a support into said frame, the sensor opens the circuit when it detects no support on a predetermined guiding means.

The guiding means of the device according to the invention, especially of the embodiment thereof, are linked the one to the other by a system for modifying the distance between guiding means for one support and guiding means for an adjacent support. Such a system is for example a jack fixed to the guiding means for a support while the rod of said jack is fixed to the guiding means for the adjacent support.

The guiding means are preferably rails, one rail being linked to an adjacent rail by means of two pairs of beams. For each pair of beams, one end of the beams are hinged to rails, while the other ends of the beams are hinged each together. The system links at least one beam of a first pair to one beam of the second pair so that by modifying the distance between the hinged connection of the beams of a first pair and the hinged connection of the beams of the second pair, the system modifies the distance between two adjacent rails.

In such a case, such a system advantageously comprises:
(a) a bolt hinged to a beam of a first pair, and
(b) a screw fastened on the shaft of a motor hinged to a beam of the second pair, the screw being engaged into said bolt so that the rotation of the screw due to the motor modifies the distance separating the hinged connections and thus the distance separating two adjacent guiding means.

When the device according to the invention, especially the embodiment thereof, is provided with a system for modifying the distance between guiding means for one support and adjacent guiding means for another support, the sensor detecting the dimension of the support provided with the product to be stored advantageously actuates the system for modifying the distance between the guiding means on which the support has to be placed and adjacent guiding means. In this way, said distance corresponds substantially to said dimension so that the space of the frame is used in the most efficient manner by no loss of space. For example, in case of a vertical frame in which supports are placed in horizontal planes, the sensor will detect the height of the support-product to be stored and will actuates the system, more specifically the motor, so that the distance in a vertical plane between the guiding means on which the support has to be placed and the adjacent upper guiding means corresponds substantially to said height.

According to a particularity of the embodiment of the device according to the invention, the system for moving the element consists of two pairs of gears mounted each on a shaft bound to a plate fixed to a beam, a chain stretching between the gears of each pair, one link of a part of the chain stretching in a substantially vertical direction being bound to the element to be moved. For each pair of gears, a motor drives a shaft so as to move the element in a substantially vertical direction.

The present invention relates also to an element suitable for a device according to the invention. Such an element comprises:
(a) means for gripping a support from the frame;
(b) means for transferring a support from the element to the frame;
(c) means for gripping a support from the working place, and
(d) means for transferring a support from the element to the working place.

Advantageously, the means for gripping and transferring a support comprises at least one gear wheel driven by a motor, the teeth of said gear wheel being intended to work with a rack fixed on the support.

Preferably, the means for gripping and transferring a support comprises at least one gear wheel driven by a motor, the teeth of said gear wheel being intended to work with a rack fixed on the support, the power of the motor being fed by a circuit comprising a switch actuated by a sensor, said sensor when detecting the end of a gripping operation or the end of a transfer operation actuating the switch so that the motor no more drives the gear wheel.

In an embodiment of an element according to the invention, it further comprises a means for displacing the gripping means.

According to a specific embodiment of an element according to the invention, it comprises:
(a) a first plate having two pairs of openings, the openings of a first pair being located near a first edge of said plate, while the openings of the other pair are located near the edge of said plate opposed to said first edge;
(b) a second plate attached to the first plate;
(c) four gear wheels, a part of which stretches through the openings;
(d) shafts on which the gear wheels are mounted, said shafts being driven by a motor attached to the second plate;
(e) a third plate provided with guiding means for the assembly first-second plates and bound to said assembly by a means for displacing said assembly in a direction substantially parallel to the plane in which said third plate stretches, and
(f) a fourth plate linked to the third plate by a means for displacing said third plate and assembly in a direction substantially perpendicular to said third plate.

A further object of the invention is a process for storing products by means of a device according to the invention.

According to a first embodiment of the process according to the invention, the process comprises the following steps:
the product to be stored is placed on a support;
a dimension of the support provided with the product is detected by a sensor and compared to the distance separating the guiding means on which the support has to be placed and adjacent guiding means;
when said dimension is lower to said distance, a switch is actuated so as to move an element for storing the support in the frame.

According to another embodiment of the process according to the invention, the process comprises the following steps:
the product to be stored is placed on a support;
a dimension of the support provided with the product is detected by a sensor and compared to the distance separating the guiding means on which the support has to be placed and adjacent guiding means;
when said dimension is greater than said distance, a switch is actuated so as to modify the distance between the guiding means on which the support has to be placed and adjacent guiding means so that said distance becomes greater than said dimension, and, when said dimension is lower to said distance, a switch is actuated so as to move the support towards the element, to move the element bearing the support up to the guiding means on which the support has to be placed and to transfer the support on the guiding means.

Finally, another object of the invention is a support suitable for a device according to the invention. Such a support is for example a plate, a box, a pallet etc. comprising a rack intended to work with a gear wheel acting as gripping means.

Other details of the invention will appear from the following description in which reference is made to the attached drawings.

BRIEF DESCRIPTION OF THE DRAWINGS

In said drawings,

FIG. 3 is a partial view in cross section along the line III—III of the detail shown in FIG. 2.

FIG. 4 to 6 are partial views of the detail shown in FIG. 2 during various steps for gripping or transferring a support.

FIG. 8 is a view of another detail of the device shown in FIG. 1.

FIG. 9 is a view of the detail shown in FIG. 8 during the movement of a guiding means with respect to another guiding means.

In these figures, the same numerals refer to similar parts of the device.

DESCRIPTION OF AN EMBODIMENT OF A DEVICE ACCORDING TO THE INVENTION

Figure 1:
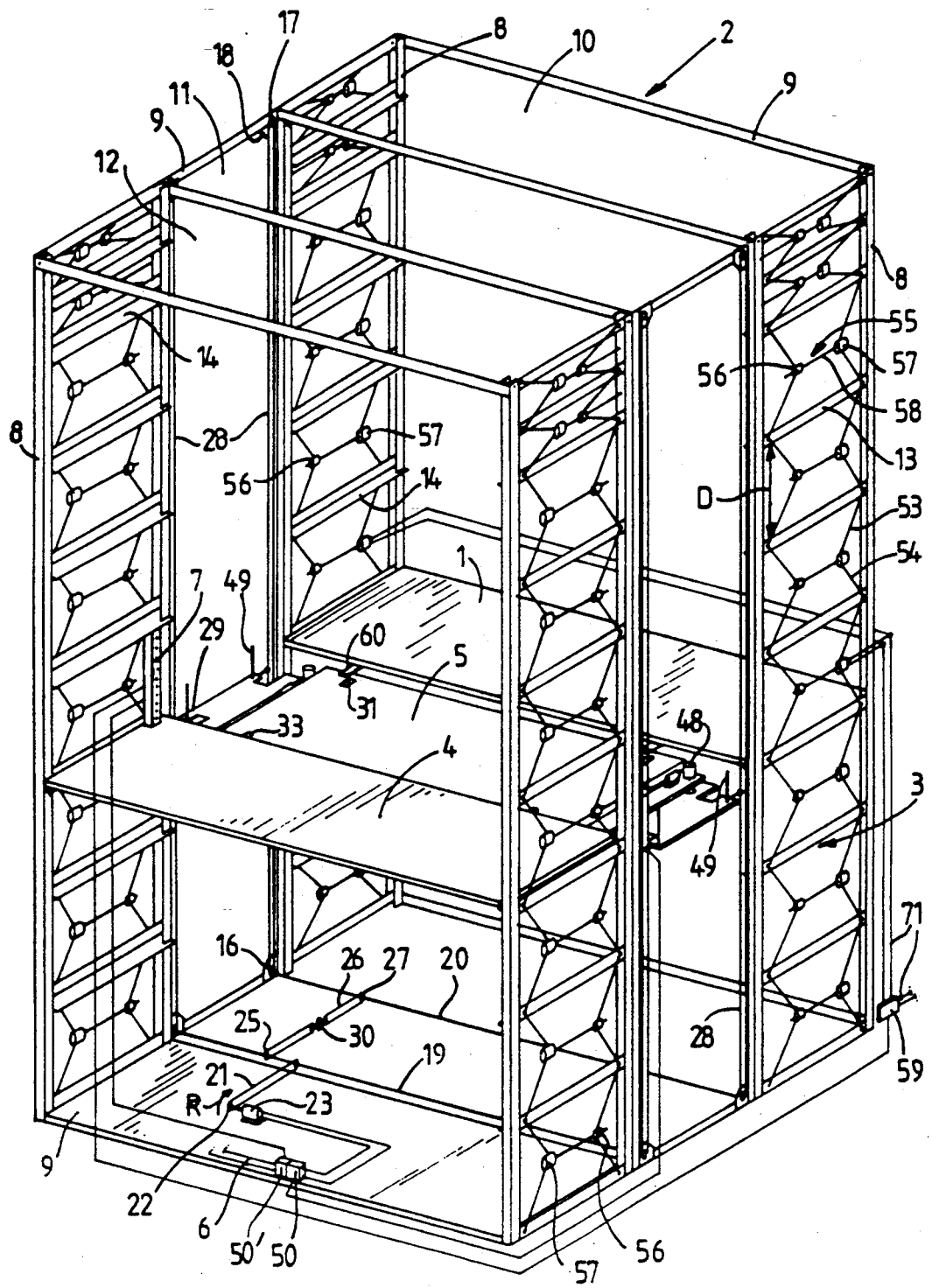
FIG. 1 is a schematic view in perspective of a device according to the invention.

FIG. 1 shows a schematic view of a device according to the invention for the storage of products placed on support plates 1.

Said device comprises:
(a) a frame 2 provided with horizontal means 3 for guiding supports 1 for the products to be stored;
(b) a working table 4 on which a support plate 1 removed from the frame 2 or to be stored in said frame 2 can be placed;
(c) an element 5 for removing a support plate from the frame, for bringing a support plate on the working table 4 and for storing a support plate in the frame;
(d) a circuit 6 for feeding power to a system 15 for moving the element 5 in a vertical direction, and
(e) a sensor 7 for detecting the height of the support provided with the product to be stored or for detecting whether or not said height is greater than a predetermined height.

The sensor 7 actuates a switch 8 mounted in the circuit 6 so as to allow the movement or displacement of a support 1 placed on the working table 4 when the height detected by the sensor 7 is lower to the distance D separating the guiding means 3 on which the support plate 1 has to be placed and the adjacent upper guiding means 3.

The frame 2 consists of eight uprights 8 linked together by traverse beams 9. In fact, the frame 2 is divided in three parts namely a first part 10 for the storage of support plates, a second part 11 for moving the element and a third part 12 for the storage of support plates, said third part 12 further comprising the working table 4.

Between the uprights 8 of the first 10 and third part 12, pair of rails 13, 14 are placed. The rails 13, 14 of one pair stretch in a horizontal plane and are parallel the one to the other.

The system 15 for moving the element 5 between the uprights 8 of the second part 11 of the frame 2 comprises four pairs of gears 16, 17, the upper gears 17 being mounted on separate shafts attached to a plate 18 welded to the traverse beams 9, while for the lower gears 16, two first gears are mounted on a first shaft 19 and the two other gears are mounted on a second shaft 20. On the first shaft 13 two other gears 24, 25 are mounted, a first being intended to be linked by a chain 21 and a gear 22 to the shaft of a motor 23, while the second gear 25 being intended to be linked by chains 26 and a reverse gear box 30 to a further gear 27 mounted on the second shaft 20. A chain 28 stretches between each pair of upper gear 17—lower gear 16. The element 5 has four arms 29, the ends of which are respectively bound to a link of a chain 28.

In this manner, due to the rotation R of the shaft of the motor 23, the element 5 can be moved in a vertical direction. Since the arms of the element 5 are linked to a part of a chain which is located in front of another part of a chain to which an arm 29 is linked, it is necessary to use between the gears 25 and 27 a reverse gear box 30.

The element 5 comprises four gear wheels 31, 32, 33, 34 which act as means for gripping a support plate from the frame or from the working table and as means for transferring a support plate into the frame or to the working table.

Figure 2:
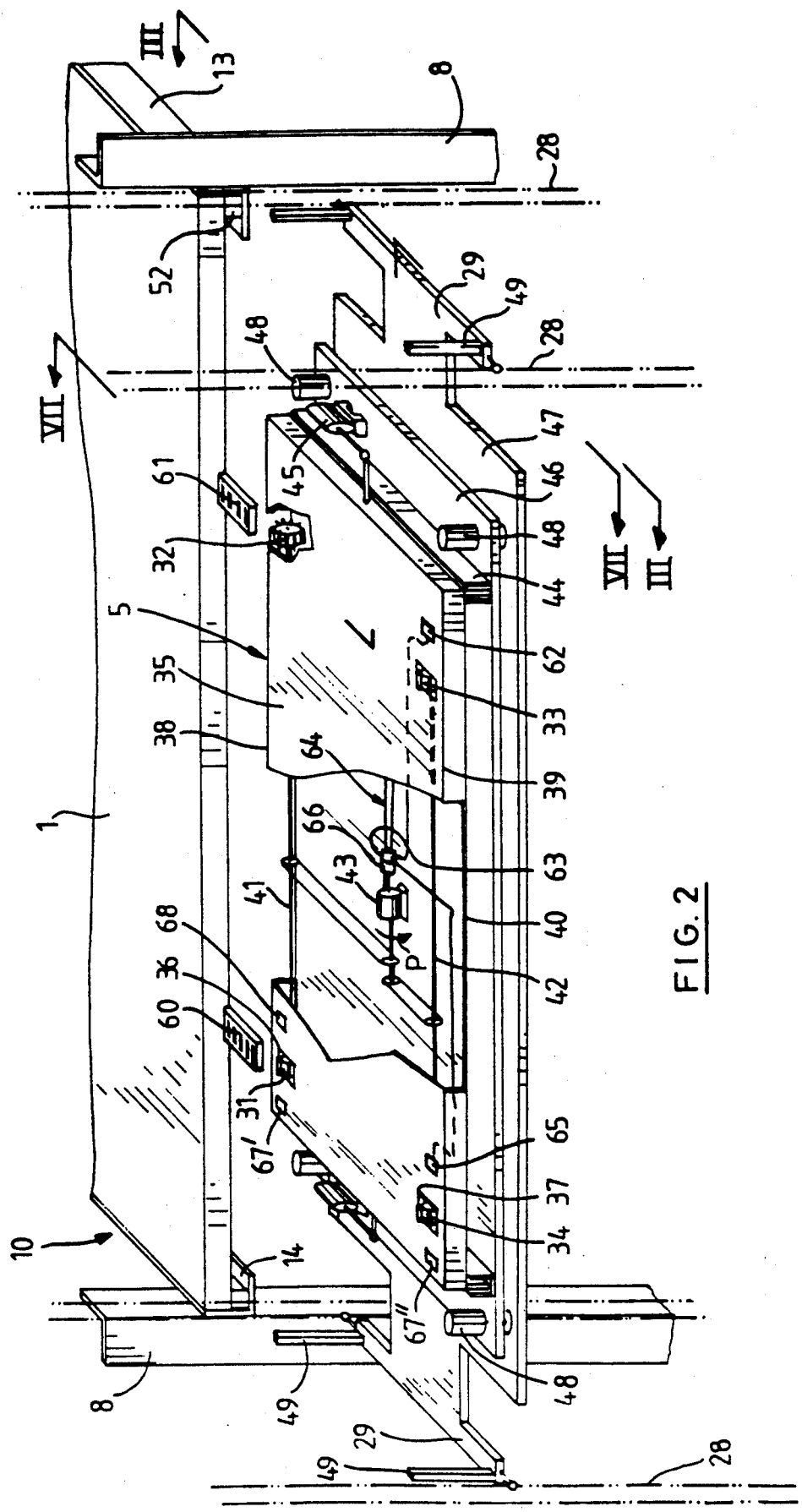
FIG. 2 is a view of a detail of the device shown in FIG. 1.
Figure 7:
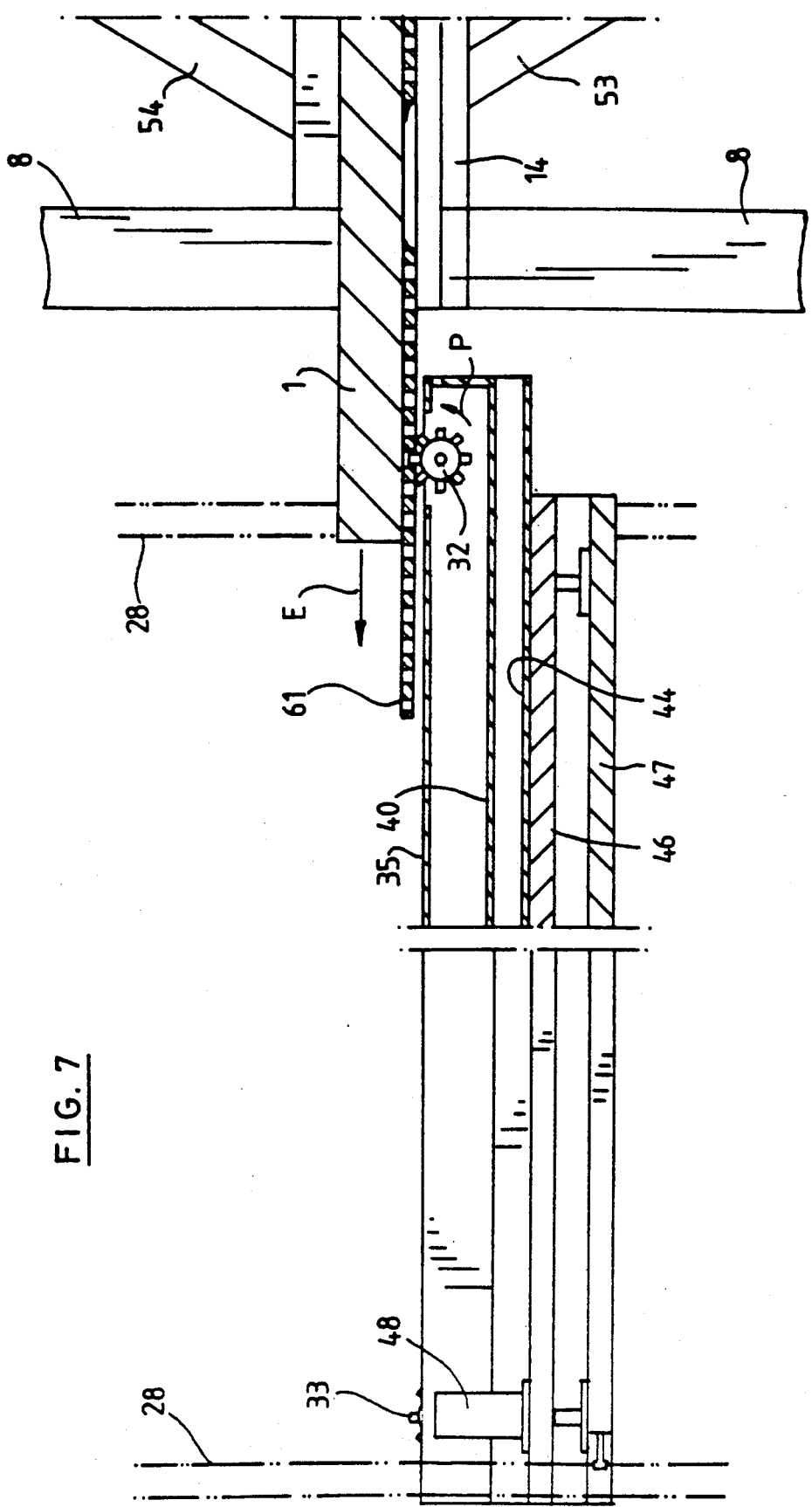
FIG. 7 is a partial view in cross section along the line VII—VII of the detail shown in FIG. 2 but during the transfer of the support.

The element 5 (see FIG. 2) comprises:
a first plate 35 having two pairs of openings 36, 37, the openings 36 of a first pair being located near a first edge 38 of the plate, while the openings 37 of the other pair are located near the edge 39 opposed to said first edge 38;
a second plate 40 attached to said first plate 35; four gear wheels 31, 32, 33, 34, a part of which stretches through the openings 36, 37;
shafts 41, 42 on which the gear wheels 31, 32, 33, 34 are mounted, said shafts being driven by a motor 43 beared by the second plate;
a third plate 46 provided with guiding means 44 for the assembly first-second plates and bound to said assembly by a jack 45 so that said assembly can be moved in a substantially horizontal direction, and
a fourth plate 47 linked to the third plate 46 by four jacks 48 for displacing the third plate 46 in a substantially vertical direction.

Each arm 29 of the element 5 bears a sensor 49 actuating a switch 50 mounted in the circuit 6 for feeding power to the motor 23 so as to move said element 5 up to a predetermined place, for example up to the moment that the element 5 is in front of guiding means on which a support plate is placed or has to be placed.

In fact, for the removal of a support from the frame the sensor 49 opens the circuit 6 when it detects guiding means on which stays the support to be removed, while for storing a support into said frame, the sensor 49 opens the circuit 6 when it detects guiding means on which no support stays.

The guiding means 13 are constituted by L beam provided with a layer 52 of Ertalon ® or another product intended to facilitate the sliding of the support 1. The guiding means 13, 14 can be clipped on the uprights 8. However, the L beams can preferably slide in U beams forming the uprights 8. A first L-beam 13 is connected to an adjacent L-beam 13 by a system for modifying the distance D between said L-beams 13. The connection of said two L-beams is made by means of two pairs of rods 53, 54. One end of the rods of a pair is hinged to a L-beam 13 or rail while the other ends of said rods are hinged together. The system 55 for modifying the distance D between two L-beams consists of a bolt 56 attached to the hinge of a first pair of rods and of a motor 57 attached to the hinge of the second pair of rods, the shaft of said motor bearing a screw 58 engaged into the bolt 56. By actuating the motor 57, the screw 58 rotates so that the distance between the L-beams 13 is modified. The length of the rods 53, 54 is lower to the half of the length of the rail or L-beam 13. A similar system 55 links two adjacent L-beams 14.

Advantageously the sensor 7 actuates a switch 59 mounted in the circuit 71 for feeding power to said motor. When said sensor 7 detects that the height of the support provided with a product to be stored is higher than the distance D separating the rails 13, 14 on which the support 1 has to be placed and the rails 13, 14 located just above, the switch 59 is actuated so that the motor 57 drives the screw 58, i.e. so as to modify the distance D.

Preferably the sensor 7 actuates said switch 59 so that said distance D substantially corresponds to the height of the support 1 to be stored, i.e. the distance D is diminished or increased respectively when the height is lower to the initial distance or greater than said initial distance D.

For example when the distance D is higher than the height of the support provided with the product to be stored, the upper rail 13,, is moved towards the lower rail 13' so that the distance D corresponds to said height (see FIG. 9).

For moving the upper rail 13" towards the lower rail 13', the motor 57 is driven so that the bolt 56 moves towards the motor 57 and so that the rods 53, 54 rotate around their hinge 70 (arrow W). The power is fed to the motor 57 by a circuit such as an electrical circuit 71 in which the switch 59 actuated by the sensor 7 is mounted. In a similar manner, upper rail 14" is moved towards lower rail 14'.

As shown in FIGS. 8 and 9, rails are advantageously provided with a longitudinal protuberance 72 while the support 1 has advantageously a groove 73. When the plate 1 is placed on the rails 13, the protuberance 72 is engaged into said groove 73 so as to ensure the correct position of the support 1 on the rails.

The device according to the invention is advantageously connected to a computer for a good working of the various steps for the storage or removal of a support plate 1.

The working of the device according to the invention will be described hereafter.

1. For the removal of a plate 1 from the frame 2.

The element 5 is moved by the chain 28 driven by the motor 23 up to the moment when the sensor 49 detects guiding means 13 on which the support 1 to be removed stays.

When such a detection is made by the sensor 49, the switch 50 is actuated so as to stop the motor 23.

At this moment the upper part of the gear wheels 31, 32, 33, 34 are substantially at a level L corresponding to the horizontal plane wherein racks 60, 61 attached to the support plate 1 stretch.

In order to transfer the support plate 1 onto the element 5, the following steps are necessary in the embodiment shown in the attached figures.

The jacks 48 are actuated so as to move the third plate 46 in the direction of the fourth plate 47 i.e. so that the upper part of the gear wheels 31, 32, 33, 34 are at a level $L_1$ under the level corresponding to the horizontal plane L wherein the racks 60, 61 stretch (arrow A).

The jack 45 is then actuated so as to slide the first and second plates and thus the gear wheels 31, 32, 33, 34 with respect to the third plate 46. In this manner the gears are located under the racks 60, 61 (arrow B).

By actuating the jacks 48, the third plate 46 is spaced from the fourth plate 47 (arrow C) so that teeth of the gear wheels are engaged into openings of the racks 60, 61.

The motor 43 is then actuated (rotation of the shaft: arrow P) so as to move the support plate 1 on to the element 5 (arrow E).

At the end of the gripping operation of a support from the frame 2, a sensor 62 when detecting the plate 1 actuates a switch 63 mounted in the circuit 64 for feeding power to the motor 43 so as to stop the rotation of the shaft of said motor 43 i.e. to stop the rotation of the gear wheels 31, 32, 33, 34.

The jack 45 is finally actuated so as to move back the first and second plates 35, 40 in their initial position with respect to the fourth plate 47.

The motor 23 then drives the chains 28 so as to move the element 5 in front of the working table 4.

When the element 5 is in front of said working table 4, the motor 43 drives the gear wheels 31, 32, 33, 34 so as to move the support 1 in the direction of the working table. At the end of the transfer operation, a sensor 65 no more detects the presence of the support 1 and actuates a switch 66 so as to stop the motor 43 and the jack 45 so as to displace the first and second plates of the element towards the working table.

Thereafter the third plate 46 is moved towards the fourth plate 47 (due to the action of the jacks 48) so that teeth of gear wheels are no more engaged into openings of the racks 60, 61 the first and second plates 35, 40 are moved back to their initial position (due to the jack 45) and finally the jacks 48 space the third plate 46 with respect to the fourth plate 47 so that the element 5 is in its initial position.

The element 5 is also provided with sensors 66, 67 for detecting the end of a gripping operation of a support from the working table 4 and for detecting the end of a transfer operation of a support 1 into the frame 2. There are two sensors for detecting the end of the transfer of a support 1 into the frame 2, a first 67' is intended to detect the end of the transfer of a support in part 10 of the frame 2 while the other 67" is intended to detect the end of the transfer of a support in part 12 of the frame 2.

2. For the storage of a support into the frame, various working steps of the device are given hereafter.

A support plate 1 is placed on the working table 4.
The gear wheels 33, 34 transfer the support plate onto the element.
The sensor 7 detects the height of the support plate 1 provided with a product to be stored.

If the support plate has to be placed on guiding means for which the distance between said guiding means and adjacent upper guiding means cannot be modified, the sensor 7 actuates a switch 8 so as to open the circuit 6, i.e. so as to avoid the displacement of the element 5.

If the distance between the guiding means 13 on which the support plate has to be placed and the adjacent upper guiding means can be modified by a system 55, the sensor 7 actuates said system so as to adapt said distance to the maximum height detected by the sensor i.e. so as to minimize the loss of space.

When the distance between the guiding means on which the support plate has to be placed and the adjacent upper guiding means is greater than the maximum height of the support plate with the product to be stored, the element 5 is moved in part 11 of the frame up to the moment when the element 5 is in front of the guiding means on which the support plate has to be placed and the support plate 1 is transferred by gear wheels into the frame 2.

It is obvious that many modifications of the device according to the invention are possible.

For example instead moving the support plate in front of the sensor 7 so as to determine the height of the support plate provided with the product to be stored, it is possible to move the sensor 7 along an edge of the working table 4 so as to determine said height.

Instead of determining the height, it is possible to determine whether or not the height of the support plate product to be stored is higher than a maximum value. Such a device is advantageously used when the distance between adjacent guiding means is constant.

In order to ensure that the element 5 will substantially remains in a horizontal plane, the arms 29 can be provided with rollers rolling on rails.

Instead of using jacks for moving plates of the element 5 therebetween it is possible to use other mechanical systems such system using racks and pinions.

When using a computer controlling the movement of the element 5, the movement of the element 5 can be decelerated when the element 5 is in the neighborhood of the working table 4 or of guiding means 13, 14 on which the support plate has to be placed or on which the support plate to be removed stays.

As sensors 7, 62, 65, 66, 49 it is possible to use photoelectric cells.

Obviously, walls may be attached to the uprights 8, so as to form a closed box having only one opening near the working table.

Instead of placing sensors 49 on the arms 29 of the element 5, said sensors may be attached to the guiding means 13.

When using a computer for controlling the use of the device, the element 5 is advantageously moved from the bottom to the top of the second part 11 of the frame 2 so as to memorize in the computer the position of the various guiding means or rails 13, 14.

The device as shown in FIG. 1 can be considered as one module of an unity for the storage of product. The height of an embodiment of a device according to the invention was 7 meters.

The device may be provided with a door so as to close the working table, with means for ensuring air conditioning in the device , . . .

When using air conditioning, for example in order to ensure a low temperature in the device, the element 5 may be placed into a box with doors so as to allow the transfer of a support or the upper guiding means adjacent to the guiding means on which the support to be removed stays is provided with a door. Still another possibility is that the support is a box in which the product to be stored is placed.

By using a device according to the invention, especially the device provided with a system for modifying the distance between two adjacent rails, it is possible to optimize the storage in volume i.e. to use in the most efficient manner a predetermined volume for the storage of product.

The device according to the invention allows also a quick removal of the desired product from the frame, especially in view of the time required for such a removal when using a device according to the prior art.

What I claim is:

1. Device for the storage of products, said device comprising:
   (a) a frame provided with means for guiding supports for said products, a distance in a direction perpendicular to the direction in which the guiding means stretch separating the guiding means for one support from the guiding means for another support;
   (b) a working place for a support removed from the frame or to be stored in said frame;
   (c) an element for removing one support from said frame and bringing it on the working place and for storing one support in said frame;
   (d) a circuit for feeding power to a system for moving the element in a direction substantially perpendicular to the direction in which the guiding means stretch, and
   (e) a sensor for detecting a dimension of the support provided with the product to be stored, said sensor actuating a switch of said circuit so as to move a support to be stored when the dimension detected by the sensor is lower to the distance between the guiding means on which the support has to be placed and the adjacent guiding means.

2. Device according to claim 1, in which the element comprises:
   (a) means for gripping a support from the frame;
   (b) means for transferring a support from the element to the frame;
   (c) means for gripping a support from the working place, and
   (d) means for transferring a support from the element to the working place.

3. Device according to claim 2, in which the means for gripping and transferring a support comprises at least one gear wheel driven by a motor, the teeth of said gear wheel being intended to work with a rack fixed on the support.

4. Device according to claim 2, in which the means for gripping and transferring a support comprises at least one gear wheel driven by a motor, the teeth of said gear wheel being intended to work with a rack fixed on the support, the power of the motor being fed by a circuit comprising a switch actuated by a sensor, said sensor when detecting the end of a gripping operation actuating the switch so that the motor no more drives the gear wheel.

5. Device according to claim 2, in which the means for gripping and transferring a support comprises at least one gear wheel driven by a motor, the teeth of said gear wheel being intended to work with a rack fixed on the support, the power of the motor being fed by a circuit comprising a switch actuated by a sensor, said sensor when detecting the end of a transfer operation actuating the switch so that the motor no more drives the gear wheel.

6. Device according to claim 1, in which the element comprises a sensor actuating a switch mounted in the circuit for feeding power to the system for moving the element, so as to move said element up to a predetermined place.

7. Device according to claim 6, in which the sensor opens the circuit (no power being fed to the system) when it detects a predetermined guiding means for one support.

8. Device according to claim 6, in which for the removal of a support from the frame, the sensor opens the circuit when it detects the presence of a predetermined support, while for storing a support into said frame, the sensor opens the circuit when it detects no support on a predetermined guiding means.

9. Device according to claim 1, in which the guiding means are linked the one to the other by a system for modifying the distance between the guiding means for one support and the guiding means for an adjacent support.

10. Device according to claim 9, in which the guiding means are rails, one rail being linked to an adjacent rail by means of two pairs of beams, for each pair of beams, one end of the beams are hinged to rails, while the other ends of the beams are hinged each together, said two pairs of rails being linked together by a system for modifying the distance between the hinged connection of the beams of a first pair and the hinged connection of the beams of the second pair.

11. Device according to claim 9, in which the guiding means are rails, one rail being linked to an adjacent rail by means of two pairs of beams, for each pair of beams, one end of the beams are hinged to rails, while the other ends of the beams are hinged each together, said two of rail being linked together by a system for modifying the distance between the hinged connection of the beams of a first pair and the hinged connection of the beams of the second pair, said system comprising a bolt hinged to a beam of a first pair and a screw fixed on the shaft of a motor hinged to a beam of the second pair, the screw being engaged into the opening of the bolt, so that the rotation of the screw due to the motor modifies the distance between the hinged connections and that between the two adjacent guiding means.

12. Device according to claim 9, in which the sensor detecting the dimension of the support provided with the product to be stored actuates the system for modifying the distance between the guiding means on which said support has to be placed and adjacent guiding means, so that said distance substantially corresponds to said dimension.

13. Device according to claim 11, in which the sensor detecting the dimension of the support provided with the product to be stored actuates the motor so as to modify the distance between the guiding means on which said support has to be placed and adjacent guiding means, so that said distance substantially corresponds to said dimension.

14. Device according to claim 9, in which the guiding means are rails, one rail being linked to an adjacent rail by means of two pairs of beams, for each pair of beams, one end of the beams are hinged to rails, while the other ends of the beams are hinged each together, said two pairs of rails being linked together by a system for modifying the distance between the hinged connection of the beams of a first pair and the hinged connection of the beams of the second pair, said system comprising a bolt hinged to a beam of a first pair and a screw fixed on the shaft of a motor hinged to a beam of the second pair, the screw being engaged into the opening of the bolt, so that the rotation of the screw due to the motor modifies the distance between the hinged connections and that between two adjacent guiding means, the beams of a first pair being linked together by a pivot on which the bolt is mounted, while the beam of the second pair are linked together by a pivot on which the motor is mounted.

15. Device for the storage of products, said device comprising:
(a) a frame provided with means for guiding supports for said products, a distance in a direction perpendicular to the direction in which the guiding means stretch separating the guiding means for one support from the guiding means for another support;
(b) a working place for a support removed from the frame or to be stored in said frame;
(c) an element for removing one support from said frame and bringing it on the working place and for storing one support in said frame;
(d) a circuit for feeding power to a system for moving the element in a direction substantially perpendicular to the direction in which the guiding means stretch, and
(e) a sensor for detecting a dimension of the support provided with the product to be stored, said sensor actuating a switch of said circuit so as to move a support to be stored when the dimension detected by the sensor is lower to the distance between the guiding means on which the support has to be placed and the adjacent guiding means, the frame consisting of a first part for the storage of supports and of a second part for the moving of the element, said first part comprising at least two pairs of uprights, traverse beams placed between uprights and pairs of rails, a first rail of a pair stretching between two uprights, while the other rail of said pair stretches between two other uprights, in a direction which is substantially parallel to the direction in which the first rail stretches, and in which the second part comprises vertical and traverse beams.

16. Device according to claim 15, in which the rails of a pair stretch in a substantially horizontal plane.

17. Device according to claim 15, in which the system for moving the element consists of two pairs of gears mounted each on a shaft bound to a plate fixed to a beam, a chain stretching between the gears of each pair, one link of a part of the chain stretching in a substantially vertical direction being bound to the element to be moved, for each pair of gears, a motor driving a shaft so as to move the element in a substantially vertical direction.

18. Device according to claim 15, in which the element comprises a sensor actuating a switch mounted in the circuit feeding power to the motor of the system so as to move the element up to a predetermined place corresponding substantially to a level of a horizontal plane in which two rails stretch.

19. Element suitable for a device according to claim 1, said element comprising:
(a) means for gripping a support from the frame;
(b) means for transferring a support from the element to the frame;

(c) means for gripping a support from the working place, and (d) means for transferring a support from the element to the working place.

20. Element according to claim 19, in which the means for gripping and transferring a support comprises at least one gear wheel driven by a motor, the teeth of said gear wheel being intended to work with a rack fixed on the support.

21. Element according to claim 19, in which the means for gripping and transferring a support comprises at least one gear wheel driven by a motor, the teeth of said gear wheel being intended to work with a rack fixed on the support, the power of the motor being fed by a circuit comprising a switch actuated by a sensor, said sensor when detecting the end of a gripping operation actuating the switch so that the motor no more drives the gear wheel.

22. Element according to claim 19, in which the means for gripping and transferring a support comprises at least one gear wheel driven by a motor, the teeth of said gear wheel being intended to work with a rack fixed on the support, the power of the motor being fed by a circuit comprising a switch actuated by a sensor, said sensor when detecting the end of a transfer operation actuating the switch so that the motor no more drives the gear wheel.

23. Element according to claim 19, said element further comprising a means for displacing the gripping means.

24. Element according to claim 19, said element comprising:
(a) a first plate having two pairs of openings, the openings of a first pair being located near a first edge of said plate, while the openings of the other pair are located near the edge of said plate opposed to said first edge,
(b) four gear wheels, a part of which stretches through the openings and
(c) shafts, on which the gear wheels are mounted, said shafts being driven by one motor.

25. Element according to claim 19, said element comprising:
(a) a first plate having two pairs of openings, the openings of a first pair being located near a first edge of said plate, while the openings of the other pair are located near the edge of said plate opposed to said first edge,
(b) a second plate fixed to the first plate
(c) four gear wheels, a part of which stretches through the openings,
(d) shafts, on which the gear wheels are mounted, said shafts being driven by one motor placed on the second plate,
(e) a third plate provided with guiding means for the assembly first - second plates and bound to said assembly by a means for displacing said assembly in a direction substantially parallel to the plane in which said third plate stretches.

26. Element according to claim 19, said element comprising:
(a) a first plate having two pairs of openings, the openings of a first pair being located near a first edge of said plate, while the openings of the other pair are located near the edge of said plate opposed to said first edge,
(b) a second plate fixed to the first plate
(c) four gear wheels, a part of which stretches through the openings,
(d) shafts, on which the gear wheels are mounted, said shafts being driven by one motor placed on the second plate,
(e) a third plate provided with guiding means for the assembly first - second plates and bound to said assembly by a means for displacing said assembly in a direction substantially parallel to the plane in which said third plate stretches,
(f) a fourth plate linked to the third plate by a means for displacing said third plate and assembly in a direction substantially perpendicular to said third plate.

27. A process for storing products in a device according to claim 1, in which:
the product to be stored is placed on a support;
a dimension of the support provided with the product is detected by a sensor and compared to the distance existing between the guiding means on which the support has to be placed and the adjacent guiding means, and
when said dimension is lower to said distance, a switch is activated so as to move an element for storing the support in the frame.

28. The process according to claim 27, in which when said dimension is lower to said distance, a switch is actuated so that the support is moved due to the gripping means towards the elements, the element with the support is moved up to the guiding means where the support has to be placed and the support is moved due to the transfer means on said guiding means.

29. The process according to claim 27, in which:
the product to be stored is placed on a support;
a dimension of the support provided with the product is detected by a sensor and compared to the distance existing between the guiding means on which the support has to be placed and the adjacent guiding means, when said dimension is greater than said distance, a switch is actuated so as to modify the distance between the guiding means where the support has to be placed and the guiding means for an adjacent support, for obtaining a distance greater than said dimension, and,
when said dimension is lower to said distance, a switch is activated so as to move an element for storing the support in the frame.

30. Support suitable for a device according to claim 2, said support being a plate comprising a rack intended to work with a gear wheel acting as gripping means.

31. Support suitable for a device according to claim 2, said support being a pallet comprising a rack intended to work with a gear wheel acting as gripping means.

* * * * *